Jan. 29, 1957 W. P. HURLEY 2,779,201
MECHANISM FOR CONVERTING LINEAR TO ROTARY MOTION
Filed Oct. 19, 1954 3 Sheets-Sheet 1
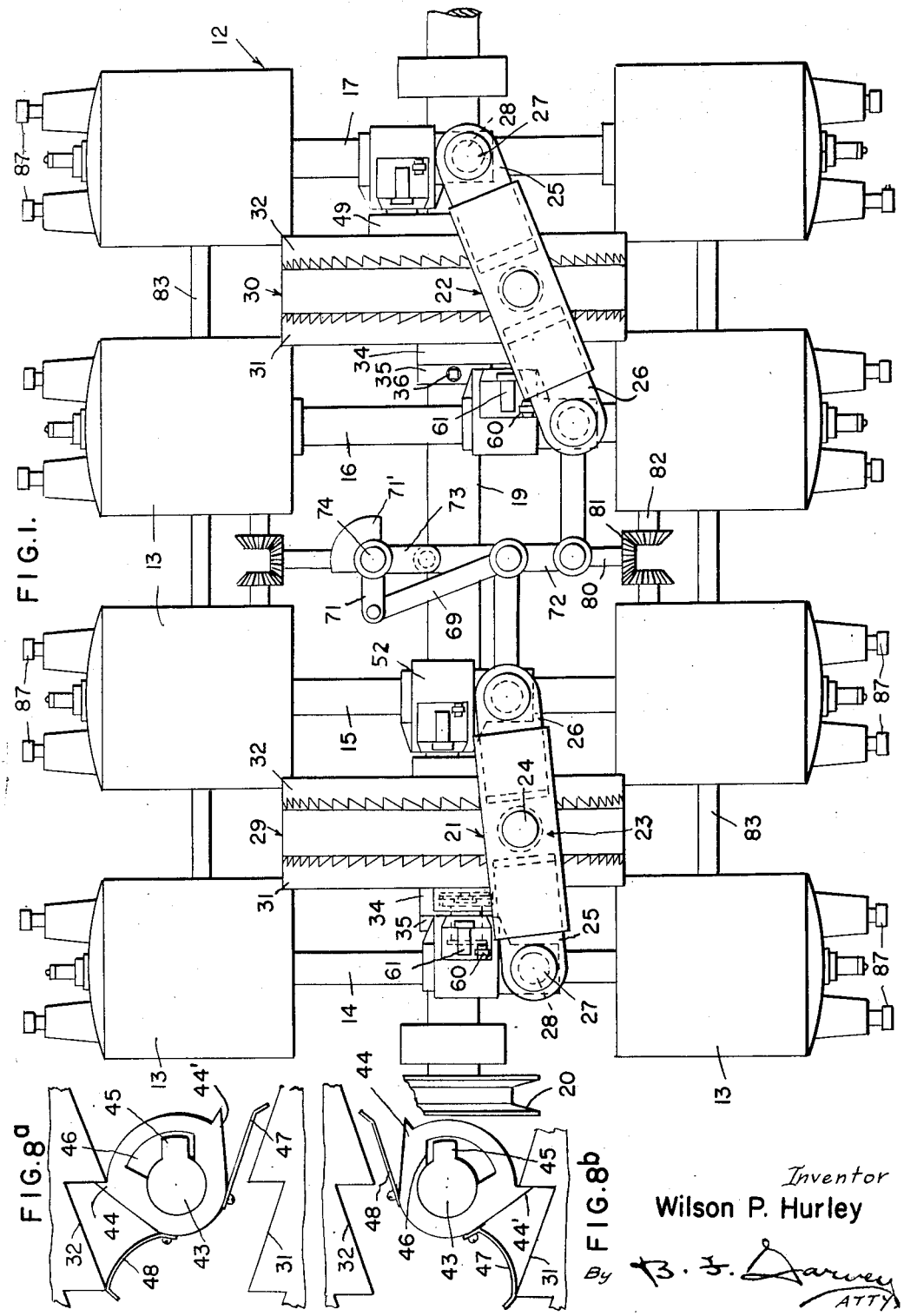
Inventor
Wilson P. Hurley
By B. F. Garvey
ATTY

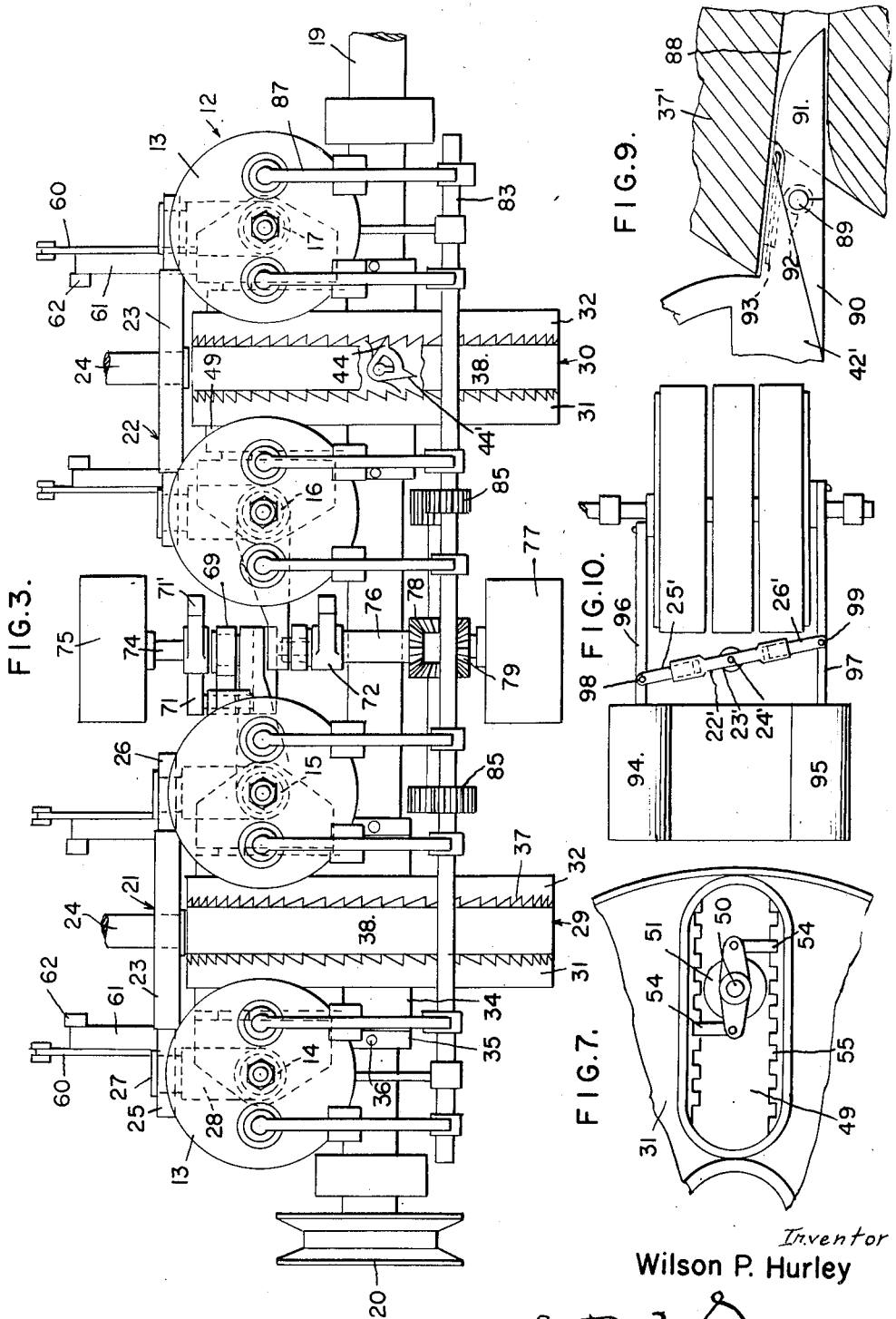

Jan. 29, 1957 W. P. HURLEY 2,779,201
MECHANISM FOR CONVERTING LINEAR TO ROTARY MOTION
Filed Oct. 19, 1954 3 Sheets-Sheet 3
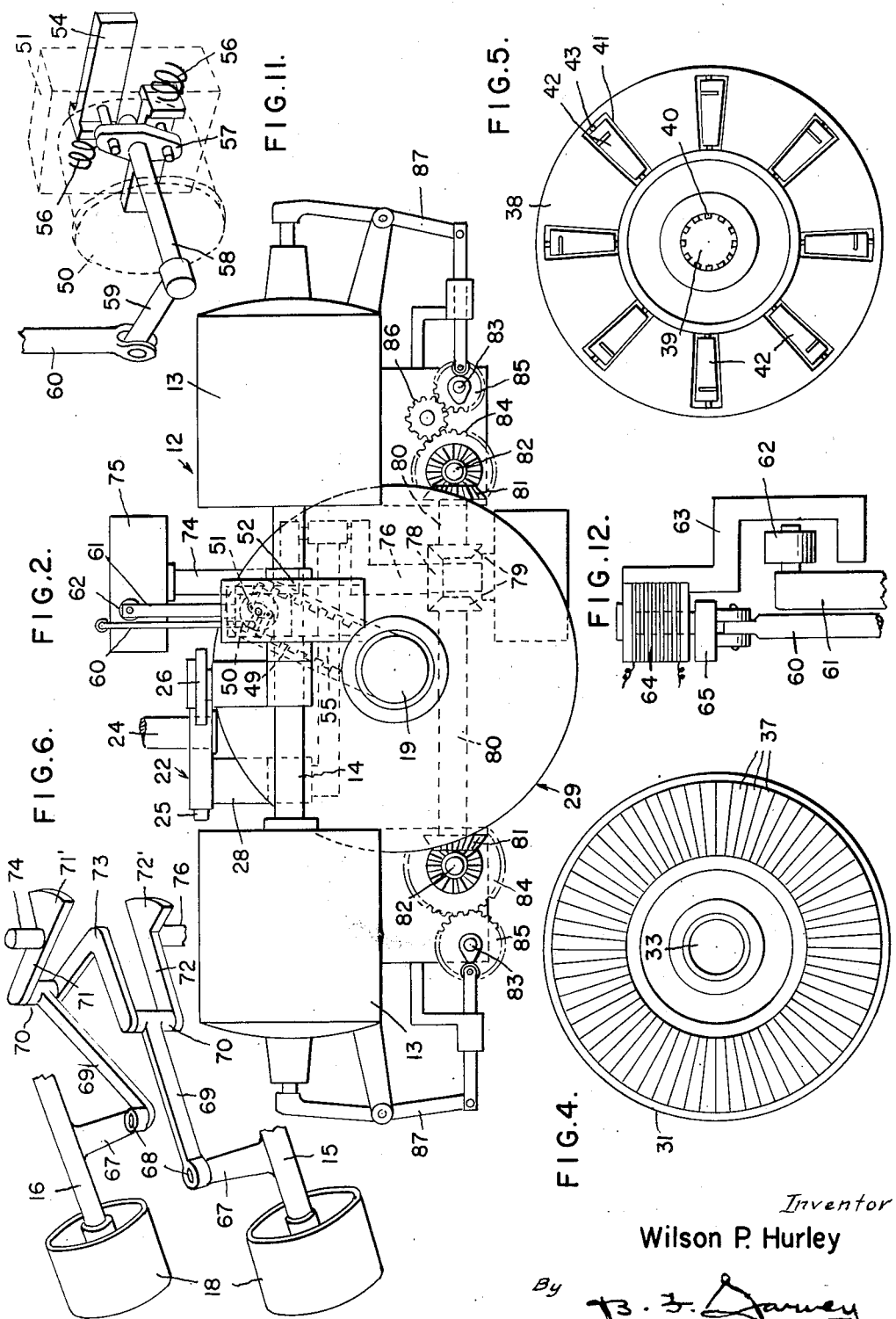
Inventor
Wilson P. Hurley
By B. F. Garvey
Atty United States Patent Office 2,779,201
Patented Jan. 29, 1957

2,779,201

MECHANISM FOR CONVERTING LINEAR TO ROTARY MOTION

Wilson P. Hurley, Albuquerque, N. Mex.

Application October 19, 1954, Serial No. 463,109

7 Claims. (Cl. 74—129)

This invention relates to pawl and ratchet type mechanism for converting linear alternating motion such as produced by a piston and cylinder, into continuous rotary motion, and is particularly adapted for transmitting power to a drive shaft from a multi-cylinder internal combustion engine.

Various devices of this general type have been patented for converting linear to rotary motion, illustrative of which are Patents Numbers 37,953, granted March 24, 1863, and 2,259,760, granted October 21, 1941. While these devices represent an advance in the art, efficient operation of an engine incorporating these units is not possible due, inter alia, to the large amount of friction generated by the pawl and ratchet members.

It is the principal object of this invention to provide mechanism operatively connected with one or more cylinders for effecting continuous rotary motion of a drive shaft connected thereto and having means for reducing the friction between moving parts to an absolute minimum.

Another object is to provide mechanism connected with one or more cylinder assemblies for converting linear to rotary motion, adjustment means being provided for varying the torque and speed of the drive shaft to which the mechanism is connected.

A further object is to provide mechanism of the character described employing parts constructed of lighter metal than presently used, which can be mass produced at less cost than crankshafts, and eliminates the need for machined piston rods.

Other objects of the invention will be manifest from the following description of the present preferred forms of the invention, taken in connection with the accompanying drawings, wherein:

Fig. 1 is a top plan view of a multi-cylinder internal combustion engine, illustrating an application of the present invention;

Fig. 2 is an end elevational view of the same;

Fig. 3 is a side elevational view of the same;

Fig. 4 is a plan view of a geared disc forming a part of the present invention;

Fig. 5 is a plan view of a drive wheel forming a part of the present invention;

Fig. 6 is a fragmentary plan view of a synchronizing vertical crankshaft forming a part of the present invention;

Fig. 7 is a fragmentary plan view of a geared disc showing to advantage the pin adjustment mechanism;

Fig. 8A is a sectional view of a dog forming a part of the present invention, illustrating one position of engagement with the geared discs, the gears being shown schematically;

Fig. 8B is a sectional view of the same, illustrating another position of engagement with the geared discs, the gears being shown schematically;

Fig. 9 is a fragmentary elevational view illustrating a modification of the dog and showing the geared disc in section;

Fig. 10 illustrates a modification of the present invention showing its application to a two-cycle internal combustion engine;

Fig. 11 is a plan view of the pin locking mechanism forming a part of the present invention, portions thereof being shown in dotted lines; and Fig. 12 is a fragmentary elevational view of mechanism for regulating the pin adjustment assembly.

In general, the internal combustion engine shown in Figs. 1 to 3 of the drawings illustrating one application of the present invention, comprises two parallel rows of four cylinders each, so arranged that all lie in the same horizontal plane and the cylinders in one row are directly opposed to those in the other row. A common rigid piston rod having piston heads secured to each terminal reciprocates between each opposed pair of cylinders to effect compression of the fuel in a well known manner. For purposes of this invention, these cylinders are divided into two sets, each set comprising the two adjacent cylinders in one row and the cylinders in the other row opposed thereto. The two adjacent piston rods in each set of four cylinders are connected by a rocker arm which causes the piston rod of one two-cylinder unit to move in a direction opposite to the other piston rod of that set. Each set is further provided with a pair of spaced parallel discs, each of which is connected to a different piston rod, which discs oscillate in response to movement of each piston rod. Due to the difference in direction of movement of the piston rods to which each disc is connected, the discs will likewise always be rotating in a different direction. The opposed faces of these discs are provided with saw-tooth gears adapted for coaction with a drive wheel interposed between the discs and affixed to the drive shaft for rotating the latter. The drive wheel has a plurality of dogs including means for alternately engaging the saw-tooth gears of both discs upon each reversal of direction thereof to effect a uniform rotation of the drive wheel and drive shaft in one direction. The two four-cylinder sets are connected and synchronized by a vertical crankshaft so that one set of four cylinders is always half a stroke out of phase with the other.

Referring now in greater detail to the drawings, I have shown in Figs. 1, 2 and 3, an eight-cylinder internal combustion engine generally designated 12, having cylinder units 13 located in the same horizontal plane, the units being disposed in pairs. Reciprocating back and forth between each pair of cylinders are piston rods 14, 15, 16 and 17 to the terminals of which are affixed conventional piston heads 18 adapted for reciprocation within cylinders 13. Intermediate the opposed cylinder units 13 is a drive shaft 19 having a conventional fan and accessories belt wheel 20 secured to one end thereof.

In carrying out the objects of this invention, piston rods 14 and 15 are joined by a rocker arm 21 and piston rods 16 and 17 are joined by a rocker arm 22. Rocker arms 21 and 22 each comprise a cylindrical housing 23, movable about a stationary pivot 24 located at its midpoint. Telescoping members 25 and 26 each have one terminal slidably engaged in housing 23, the other terminal being pivoted to a pin 27. Pin 27 is secured to a rocker arm post 28 which is rigidly fastened to the piston rod at approximately its mid-point.

Mounted on drive shaft 19 between piston rods 14 and 15 and piston rods 16 and 17 are transmission assemblies 29 and 30. Each assembly includes a pair of discs 31 and 32 having central openings 33 for mounting on drive shaft 19. The outer faces of discs 31 and 32 are provided with bearing skirts 34 which abut restraining collars 35, the latter being secured to drive shaft 19 by suitable means 36 to prevent axial displacement of discs 31 and 32. As shown to advantage in Fig. 4, at a point about midway from the center to the outer periphery of the opposed faces of discs 31 and 32, there are provided sawtoothed radial gears 37. As indicated in Fig. 1, the gears of the two opposed faces are set in opposite directions for reasons which will be hereinafter more fully set out. Interposed between each pair of spaced discs is a drive wheel 38 having a central opening 39, adjacent which opening are splined gears 40 for fixedly engaging the wheel to drive shaft 19 so that the latter is rotatable therewith. Referring now to Fig. 5, it will be seen that wheel 38 is provided with a plurality of radial openings 41 extending from a point about midway from the center to the outer periphery of the wheel. In each opening there is a dog 42 pivotally mounted on a shaft 43 extending longitudinally thereof, the terminals of the shaft being journaled in the end walls of opening 41. Dog 42 includes teeth 44 and 44' adapted for engagement with the saw-tooth gears of discs 32 and 31 respectively. The number of saw-tooth gears on discs 31 and 32 must be an even multiple of the dogs on drive wheel 38. Shaft 43 is provided with a key 45 which coacts with an arcuate slot or keyway 46 in dog 42 to limit the rotation of the latter about shaft 43. Rotation of dog 42 about shaft 43 is effected by means of spring members or feelers 47 and 48 secured to both faces of dog 42, which feelers engage the gears of discs 31 and 32 respectively. Since the gears of the two opposed faces of discs 31 and 32 are set in opposite directions, upon rotation of these two discs in opposite directions, feelers 47 will ride along the top of the saw-tooth gears of discs 31 while feelers 48 engage the sawtooth gears of disc 32 and exert a rotary pressure on dog 42 which pivots tooth 44 into engagement with one of the saw-tooth gears of disc 32 (see Fig. 8a). Upon reversal of the two discs, feelers 48 ride along the top of the saw-tooth gears of discs 32 and feelers 47 engage the saw-tooth gears of disc 31 and exert a pressure on dog 42 to pivot tooth 44' into engagement with one of the saw-tooth gears of disc 31 (see Fig. 8b). By this arrangement, it is noted that drive wheel 38 and consequently drive shaft 19 will always move in the same direction. Inorder to prevent binding of dogs 42 and gears 31 and 32 that might occur when the latter slow down prior to reversing direction, dogs 42 are so designed that the rectilinear distance between the tips of teeth 44 and 44' is less than the distance between opposed tips of saw-tooth gears 31 and 32.

To effect rotation of discs 31 and 32 in opposite directions, the outer face of each disc is provided with a radial groove 49 which carries a pin 50. Pin 50 is journaled in a block 51 which in turn is slidably mounted in a vertical channel member 52. Each channel member 52 is fixedly secured to piston rods 14, 15, 16 and 17 in any suitable manner. Since piston rods 14 and 15 and piston rods 16 and 17 oscillate in opposite directions and are constantly changing direction, the motion conveyed to discs 31 and 32 are correspondingly in opposite directions and the same reciprocating motion is likewise transmitted to these discs.

For changing the torque-speed ratio of the transmission mechanism, blocks 51 are provided with locking pins 54. As shown in Fig. 10, one terminal of each pin 54 extends through an opening in each side of block 51 for engagement in one of a plurality of recesses 55 located along the margin of radial groove 49. Pins 54 are normally urged into locking engagement by coil springs 56 located between the inner terminals, the pins and the side walls of block 51. Each pair of locking pins 54 are joined by a connector 57 to the center of which is fixed a crankshaft 58 which extends axially of pin 50. Affixed to the outer terminal of crankshaft 58 and at right angles thereto is an unlocking shaft 59 having a control staff 60 connected thereto. Upon depression of staff 60, unlocking shaft 59 moves downward and rotates crankshaft 58 to "unlock" pins 54. To reposition pin 50 in radial groove 49, there is attached to block 51 in which pin 50 is journaled, a vertical operating shaft 61, having a roller 62 at the upper terminal thereof which is housed within a U-shaped grip 63 to facilitate up and down movement of shaft 61. To effect automatic unlocking of pins 54, a solenoid 64 having an actuating bar 65, is attached to the upper terminal of grip 63. Upon energization of solenoid 64, bar 65 moves into engagement with staff 60 depressing the latter and unlocking pins 54 in a manner set out above. While the drawings indicate that pins 50 of discs 31 and 32 of both transmission assemblies are individually adjusted in radial grooves 49, it is to be understood that any suitable conventional means may be employed for simultaneously relocating these pins.

To synchronize and connect the two sets of cylinders, there is provided a vertical crankshaft generally designated 66 and shown to advantage in Fig. 6. Crankshaft 66 comprises a pair of rigid arms 67 secured at one end to piston rods 15 and 16. Pivotally connected to the other end of arms 67 by wrist pins 68, are articulating rods 69 having bearings 70 for the reception of two throws 71 and 72. Counterweights are indicated at 71' and 72'. The two throws 71 and 72 are placed ninety degrees from each other by an L-shaped connecting rod 73 so that one set of four cylinders is always half a stroke out of phase with the other.

Extending upwardly from crankshaft throw 71 is a shaft 74 for driving a conventional distributor 75. To throw 72 is attached a similar shaft 76 for a starter 77 in a well known manner. Shaft 76 is further provided with a bevel gear 78 which meshes with mating gears 79 to actuate a pair of valve cam drive shafts 80. Drive shafts 80 in turn have bevel gears 81 engageable with drive shaft extensions 82 which actuate valve cam shaft 83 through reduction gears 84 and 85. 86 represents an idler gear. Valve cam shaft 83 operates valve push rod and rocker 87 in a conventional manner.

Vertical synchronizing shaft 66 does not provide power from one end of the engine to the other, or assist the return of the pistons as they complete the three powerless cycles. These duties are performed by the four cylinders in each set through the rocker arms and the synchronizing crankshaft does not carry any load other than the valve cam drive shaft and distributor, except while starting the engine or in the event one cylinder fails to fire. At all other times the synchronizing crankshaft merely acts as a monitor over the relative positions of the two sets of four cylinders and the drive assemblies. The synchronizing shaft however, is adequate to absorb all forces bearing on it. I am aware that this shaft may have to absorb considerable lateral thrust at times when the pistons of either set are reversing. In addition, this thrust is minimized by proper valve timing and a short period of combustion.

In operation, engine 12 is started in a conventional manner, thereby initiating the reciprocating motion of piston rods 14, 15, 16 and 17 between each pair of cylinders 13. Rocker arms 22 cause piston rods 14 and 15 and piston rods 16 and 17 to move in opposite directions and synchronizing crankshaft 66 functions to keep one set of four cylinders half a stroke out of phase with the other set of four cylinders. Crankshaft 66 further controls operation of the distributor 75 and starter 77. It further actuates cam shaft 83 to operate valve push rods and rockers 87 in a manner well known in the art. The reciprocating motion of piston rods 14, 15, 16 and 17 is conveyed to discs 31 and 32 of transmission assembly 29 and 30 by means of pins 50 carried by discs 31 and 32. Pins 50 are journaled in blocks 51 which are mounted in vertical channel members 52 secured to each piston rod 14, 15, 16 and 17. By this arrangement of parts, discs 31 and 32 constantly move in opposite directions and are constantly changing direction of movement. Engaged with the opposed radial gears 37 of discs 31 and 32 is drive wheel 38 having dogs 42 alternately engaged with the radial gears of discs 31 and 32. The opposite faces of each dog 42 have spring feelers 47 and 48. Feelers 47 and 48 operatively engage the radial gears of discs 31 and 32 only when the latter rotate in the same direction as drive wheel 38 rotates. This is clearly illustrated by Fig. 8A and 8B of the drawing which show both positions assumed by dog 42 during the operational cycle of discs 31 and 32. Alternate engagement of dog 42 with discs 31 and 32 produces a continuous rotation of drive wheel 38 and consequently drive shaft 19, in one direction. Adjustment of the mechanism to change the torque speed ratio is effected by first energizing solenoid 64 which depresses staff 60 to unlock pins 54 in recesses 55 of radial groove 49. Pin 50 is then repositioned by raising or lowering block 51 in which pin 50 is journaled, thereby changing the torque speed ratio. As shown in Fig. 11, a grip 63 may be provided to facilitate raising and lowering of block 51.

In Fig. 9 there is shown a modified form of the present invention, especially adapted for low speed engines such as steam engines, where the shaft carries a heavy load working against the engine. In this form, discs 31 and 32 have radial gears 37', each gear having an opening 88 at a point near the outer periphery of discs 31 and 32. Drive wheel 38 has dogs 42' adapted for engagement with the radial gears 37' of discs 31 and 32. Instead of the spring feelers shown in the preferred form of the invention, however, there is attached to each face of dog 42', a feeler preferably made of steel and comprising a stationary portion 90 affixed to dog 42' to which portion is pivotally connected at 89 a movable portion 91. Coil 92 of a light steel spring 93 engages pivot 89 to normally hold movable portion 91 in an extended position. Upon engagement of movable portion 91 with a radial gear 37', the tip end of the former passes into opening 88 to positively engage disc 31 or 32 depending on the direction of rotation thereof.

Fig. 10 illustrates another application of the present invention and shows the use thereof as applied to an engine powered by two two-cycle gasoline cylinders 94 and 95, having piston rods 96 and 97 respectively. Piston rods 96 and 97 are joined to pins 50 of discs 31 and 32 in the manner set out above in the description of the preferred form. Pistons rods 96 and 97 are connected by a rocker arm 22' which comprises a cylindrical housing 23' movable about a stationary pivot 24' located at its mid-point. Telescoping members 25' and 26' each have one terminal slidably engaged in housing 23', the other terminals being pivotally engaged with piston rod 96 and 97 at 98 and 99 respectively. This form of the invention shows to advantage how the device of the present invention when applied to a short-stroke rapid firing engine effects a greater torque on the drive shaft while, at the same time, gearing down the rate of rotation thereof.

It will be seen from the foregoing that an engine incorporating in it the present device, will not function unless power is delivered for each movement of discs 31 and 32. Thus in the case of a standard four-cycle gasoline engine, it is necessary that four cylinders be employed in conjunction with the present mechanism. On the other hand, with a reciprocating steam engine, where the piston is drawn back and forth under power, as well as thrust out under power, only one cylinder is necessary.

While the invention has been shown and described in its present preferred forms, it is nevertheless to be understood that various changes may be made therein, which may come within the scope of the appended claims.

What I claim is:

1. Mechanism for converting linear to rotary motion comprising apparatus for producing linear motion and a second apparatus operatively connected to the first apparatus for converting the linear into rotary motion, the second apparatus embodying parallel discs, opposed faces of said discs being toothed, means connecting the first apparatus to said discs for rotating the latter in opposite directions and reversing the direction of rotation thereof at specified intervals, a drive wheel interposed between said discs having a plurality of dogs pivotally mounted therein and adapted for engagement with the gears of the discs, and feelers affixed to said dogs and engaged with said discs for pivoting the dogs at predetermined intervals into engagement with alternate discs.

2. For use in converting linear to rotary motion, parallel discs, opposed faces of said discs being toothed, means connected with said discs for rotating the latter in opposite directions and reversing the direction of rotation thereof at specified intervals, a drive wheel interposed between said discs having a plurality of dogs pivotally mounted therein and adapted for engagement with the gears of the discs, and feelers affixed to said dogs and engaged with said discs for pivoting the dogs at predetermined intervals into engagement with alternate discs.

3. For use in converting linear to rotary motion, discs, a drive shaft, a drive unit secured to said drive shaft, the unit including spring means secured thereto for urging a movable part of the unit into engagement with alternate discs at predetermined intervals, pins carried by said discs, said pins being radially adjustable to regulate the speed torque ratio of the drive shaft, and means connected with the pins for rotating said discs in opposite directions and reversing the direction of rotation thereof at specified intervals.

4. In transmission mechanism for internal combustion engines including pairs of opposed cylinders, each pair of cylinders having a common piston rod reciprocating therebetween, a toothed disc interposed between each pair of opposed cylinders, a connecting arm between each disc and adjacent piston rod for effecting a reciprocating rotary motion of the disc upon reciprocation of the piston rod, means joining adjacent piston rods in a manner to effect movement thereof in opposite directions, a drive shaft, a drive wheel secured to said drive shaft and having a plurality of dogs alternately engageable with said discs at predetermined intervals, and spring means attached to said dogs for effecting alternate engagement of said drive wheel with said discs at predetermined intervals.

5. In transmission mechanism for internal combustion engines including pairs of opposed cylinders, each pair of cylinders having a common piston rod reciprocating therebetween, a toothed disc interposed between each pair of opposed cylinders, a connecting arm between each disc and adjacent piston rod for effecting a reciprocating rotary motion of the disc upon reciprocation of the piston rod, a rocker arm joining adjacent piston rods, said rocker arm being pivoted about its midpoint to effect movement of said piston rods in opposite directions, a drive shaft, and a drive wheel secured to said drive shaft and having a plurality of dogs alternately engageable with said discs at predetermined intervals.

6. A transmission mechanism as set out in claim 5, with the addition of a crank shaft connecting adjacent sets of joined piston rods to synchronize operation of the engine.

7. For use in converting linear to rotary motion, parallel discs, the opposed faces of said discs being toothed, and provided with openings near the outer periphery thereof, means connected with said discs for rotating the latter in opposite directions and reversing the direction of rotation thereof at specified intervals, a drive unit alternately engaged with each of said discs, the unit including a plurality of dogs alternately engageable with said discs, each of said dogs having extended portions pivotally connected thereto, said extended portions being adapted for engagement with the disc openings at predetermined intervals.

References Cited in the file of this patent

UNITED STATES PATENTS

| | | |
|---|---|---|
| 642,636 | Small | Feb. 6, 1900 |
| 1,699,803 | Myers | Jan. 22, 1929 |
| 2,385,457 | Morgan | Sept. 25, 1945 |
| 2,750,934 | May | June 19, 1956 |

FOREIGN PATENTS

| | | |
|---|---|---|
| 552,105 | Germany | June 9, 1932 |